Feb. 8, 1966   D. H. BAKER ETAL   3,233,332
EARTH'S MAGNETIC FIELD RESPONSIVE SYSTEMS
Filed July 9, 1962
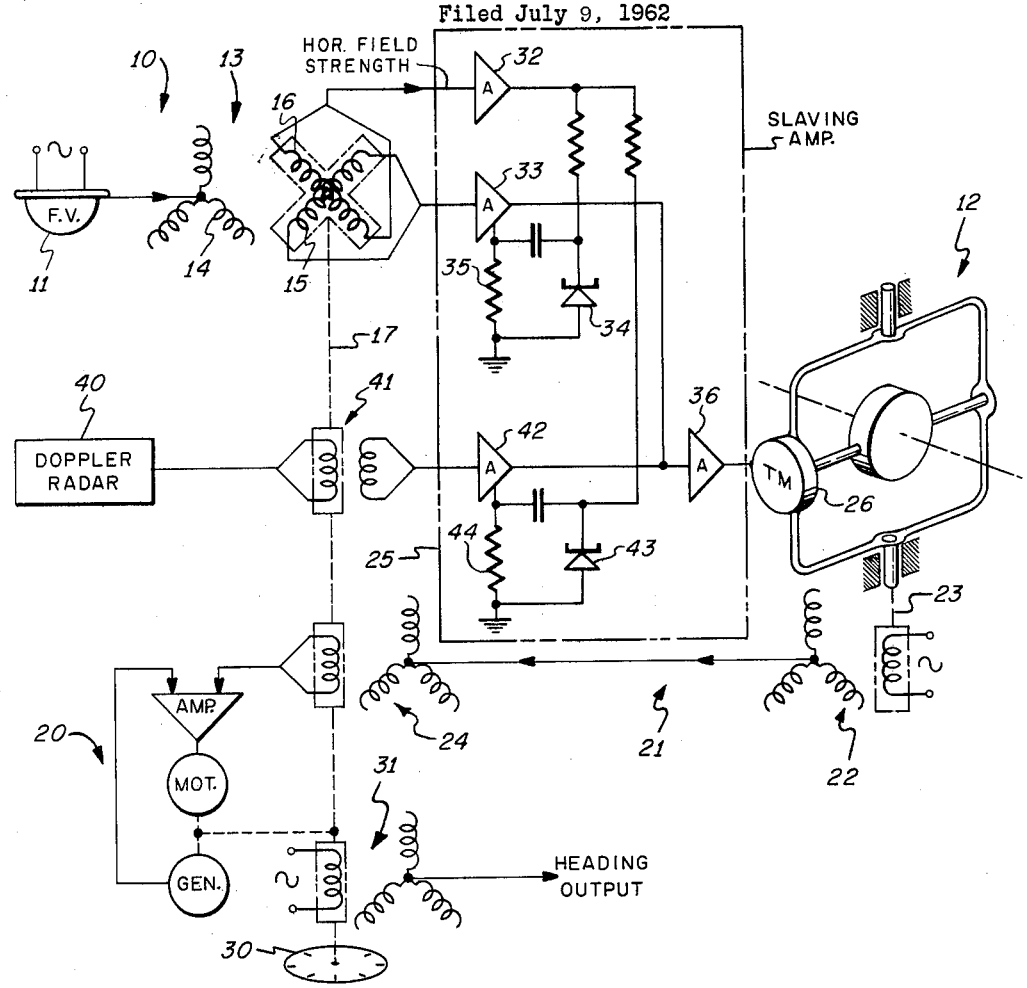
INVENTORS
DONALD H. BAKER
RICHARD K. RADTKE
BY
          H P Terry
          ATTORNEY

3,233,332
EARTH'S MAGNETIC FIELD RESPONSIVE SYSTEMS

Donald H. Baker and Richard K. Radtke, Phoenix, Ariz., assignors to Sperry Rand Corporation, Great Neck, N.Y., a corporation of Delaware
Filed July 9, 1962, Ser. No. 208,423
3 Claims. (Cl. 33—222)

This invention relates to systems responsive to the earth's magnetic field. It is applicable to gyromagnetic systems such as compass systems and gyro stabilized platforms.

In gyromagnetic compass systems, for example, of the type shown in U.S. Patent No. 2,357,319, entitled Flux Valve Magnetic Compass issued September 5, 1944 to Esval et al., difficulty may be experienced particularly when flying at high latitudes due to the decreasing strength of the horizontal component of the earth's magnetic field. The error signal which precesses the directional gyroscope of the gyromagnetic compass system is a function of the slaving error and the strength of the horizontal component of the earth's magnetic field. Thus, at high latitudes where the strength of the horizontal component is considerably less than that at lower latitudes, the system experiences decreased sensitivity resulting in a less accurate heading signal.

Gyromagnetic compass systems are also subject to errors due to meridian convergence effects. Previous attempts at correcting for meridian convergence effects involve complex techniques based on periodically and manually inserting approximate correction signals whereas the present invention provides automatic and accurate compensation for meridian convergence effects. Thus, the present invention provides superior accuracy by providing corrections which have the same functional dependence as the errors they correct.

It is an object of the present invention to compensate for the variations in the earth's field strength in apparatus responsive to the earth's magnetic field.

It is an additional object of the present invention to compensate for signal sensitivity variations due to variations in the earth's magnetic field.

It is a further object of the present invention to vary the gain in a gyromagnetic system in accordance with the variations in the earth's magnetic field strength to compensate for undesirable fluctuations thereof.

It is another object of the present invention to provide accurate compensation for meridian convergence effects in gyromagnetic systems.

The above objects are achived by means responsive to the earth's magnetic field which provides a compensating signal representative of a function of the earth's magnetic field strength. The compensating signal is applied to the gyromagnetic system in a manner to maintain the over-all sensitivity of the system at a predetermined value in spite of the variations in the earth's magnetic field strength to thereby provide substantially the same accuracy at all latitudes. The compensating signal is also combined with a signal representative of the east-west velocity of the craft to provide accurate compensation for meridian convergence effects at all latitudes.

Referring now to the single figure constituting the drawing, a schematic diagram of a gyromagnetic compass system incorporating the present invention is shown.

Referring to the drawing a gyromagnetic compass system 10 of the type generally disclosed in said U.S. Patent No. 2,357,319 includes a flux valve 11 which is responsive to the horizontal component of the earth's magnetic field and provides a signal representative thereof whose average value accurately represents the heading of the aircraft upon which the flux valve 11 is mounted. The heading signal from the flux valve 11 oscillates about an average value at a low frequency during normal operation. To stabilize the heading signal from the flux valve 11, a directional gyroscope 12 is combined therewith in order that the directional gyro 12 is slaved to the horizontal component of the earth's magnetic field as sensed by the flux valve 11 and the directional gyro inertia effectively prevents any oscillation of the heading indicator. Although the directional gyroscope 12 does not oscillate due to its large inertia, is does exhibit a slow drift from its initial setting. By slaving the directional gryoscope 12 to the flux valve signal, the slow drift of the directional gyroscope 12 is corrected by precessing the gyroscope 12 in accordance with the heading signal in a well known manner. The heading signal from the flux valve 11 is transmitted to a synchro control transformer 13. The signal within the stator winding 14 of the control transformer 13 has the same direction and strength as the horizontal component of the earth's magnetic field with respect to the flux valve secondary coils within the flux valve 11.

The rotor of the control transformer 13 has two orthogonally disposed rotor windings 15 and 16. The rotor windings 15 and 16 are mounted on a heading shaft 17 which is positioned by a servo loop 20, that in turn is controlled in a manner to be described by the directional gyroscope 12. The servo loop 20 receives its signal by means of a synchro data transmission system 21 which includes a synchro transmitter 22 that has its rotor connected to an extension 23 of a vertical trunnion of the directional gyroscope 12. The stator of the synchro transmitter 22 is connected to the stator of a synchro receiver 24 which has its rotor mounted on the heading shaft 17 and provides an output signal to the servo loop 20.

The rotor winding 15 of the control transformer 13 converts the signal from the flux valve 11 into an error signal whose amplitude and phase represents the orientation of the rotor winding 15 with respect to the magnetic field in the stator winding 14. If the rotor winding 15 is not positioned in alignment with the flux valve signal, an error signal is generated. The error signal from the rotor winding 15 is transmitted to a slaving amplifier 25 which converts the error signal into a form suitable to drive a gyro precession torque motor 26 mounted on the directional gyroscope 12. The directional gyroscope 12 is precessed in azimuth in accordance with the error signal until the directional gyro 12 is aligned with the flux valve signal.

A signal representative of the azimuthal orientation of directional gyro 12 is transmitted through the data transmission system 21 to the servo loop 20 which drives the heading shaft 12 in a direction and through an angle to null the error signal emanating from the rotor winding 15 of the control transformer 13. The position of the heading shaft 17 is thus representative of the aircraft heading and may be indicated by a compass card 30 mounted on the heading shaft 17 or an electrical signal representative thereof may be transmitted to remote compass repeaters by means of a synchro transmitter 31 associated with the heading shaft 17. The above description relates to a conventional gyromagnetic compass system. At high latitudes the sensitivity of a conventional system deteriorates due to the decreasing strength of the horizontal component of the earth's magnetic field. In order to compensate for this effect, the rotor winding 16 of the control transformer 13 is disposed to provide a maximum signal when the rotor winding 15 is at a null. The signal emanating from the rotor winding 16 is representative of the strength of the horizontal component of the earth's magnetic field.

In the embodiment of the present invention shown in the drawing, the signal from the rotor winding 16 is applied to the input of a gain control amplifier 32. With a large input signal, i.e., when the field strength is high the automatic gain control current from the amplifier 32 is low and conversely when the field strength is low, the automatic gain control current is high. The signal from the rotor winding 15 is applied to the input of a slaving amplifier 33. The amplifiers 32 and 33 may be transistor amplifiers, for example. The automatic gain control current flows through a uni-tunnel diode 34. The uni-tunnel diode 34 acts as an impedance changing device whose impedance varies directly with control current. The uni-tunnel diode 34 and an emitter resistor 35 are in parallel and form the total impedance in the emitter circuit of the slaving amplifier 33. As the earth's magnetic field strength varies, the control current changes which varies the impedance of uni-tunnel diode 34 that in turn automatically establishes the proper gain of the slaving amplifier 33. The output of slaving amplifier 33 is amplified in a power amplifier 36 for driving the torque motor 26. This invention maintains a constant gain slope with variations in magnetic field strength thereby preventing slaving amplifier sensitivity from deteriorating at high latitudes as in previous systems.

To provide accurate compensation for meridian convergence effects, doppler radar means 40 provides a signal representative of the aircraft velocity to a synchro resolver 41 having its rotor connected to the heading shaft 17. The resolved output signal that is representative of the east-west velocity of the aircraft from the resolver 41 is applied to the input of a meridian convergence amplifier 42. The automatic gain control current from the amplifier 32 flows thru a uni-tunnel diode 43 which is in parallel with an emitter resistor 44 thereby changing the total emitter impedance directly with the control current and inversely with the horizontal field strength. The meridian convergence rate is substantially proportional to the east-west component of the velocity of the craft and the tangent of the magnetic latitude. The magnetic latitude is a function of the horizontal field strength. The gain change caused by the automatic gain control current shapes the output voltage to the slaving torque motor 26 to the level required to fit the meridian convergence curve. The output from the meridian convergence amplifier 42 is summed with the output of the slaving amplifier 33 and the resultant signal is amplified in the amplifier 36. The amplified resultant signal drives the slaving torque motor 26 which in turn precesses the spin axis of the directional gyro 12 at a rate which accurately cancels the meridian convergence effect and accurately slaves the compass card 30 to the flux valve signal.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:
1. In a gyromagnetic compass system for craft,
 (1) means responsive to the horizontal component of the earth's magnetic field strength for providing a signal in accordance therewith,
 (2) means for providing a signal representative of the east-west velocity of said craft,
 (3) and means responsive to said field strength and velocity signals for providing a compensating signal representative of the meridian convergence error occasioned by movement of said craft.

2. In a gyromagnetic compass system for craft,
 (1) directional gyroscopic means,
 (2) means for precessing said gyroscope in azimuth,
 (3) transmitting means for generating a control signal varying with the direction and strength of the horizontal component of the earth's magnetic field, said control signal being subject to error due to meridian convergence effects occasioned by movement of said craft,
 (4) means for providing a signal representative of the strength of the horizontal component of the earth's magnetic field,
 (5) means for providing a signal representative of the east-west velocity of said craft,
 (6) and further means including control means responsive to said control signal, field strength signal and east-west velocity signal for controlling said precessing means in accordance with said control signal as compensated for meridian convergence effects, said further means including means combining said field strength signal and said east-west velocity signal to effect the meridian convergence compensation.

3. In a gyromagnetic compass system for craft,
 (1) directional gyroscope means,
 (2) means for precessing said gyroscope in azimuth,
 (3) transmitting means generating a signal varying with the direction of the horizontal component of the earth's magnetic field,
 (4) synchro means connected to receive said signal, said synchro means including a null rotor winding positioned by said gyroscopic means for providing a control signal having a phase and amplitude dependent upon departure of said directional gyroscope means from a predetermined azimuth orientation,
 (5) said synchro means further including a second rotor winding positioned by said gyroscopic means to produce a compensating signal representative of the horizontal component of the earth's magnetic field strength,
 (6) means for providing a signal representative of the east-west velocity of said craft,
 (7) and amplifying means connected to control said precessing means and responsive to said control signal and to said east-west velocity signal and biased as a function of said compensating signal to compensate for the variations in amplitude of said control signal due to variations in the earth's magnetic field strength whereby said gyroscope is accurately corrected for departures from a predetermined azimuth orientation and for meridian convergence effects, said amplifying means further including means combining said compensating signal and said east-west velocity signal to effect said compensation.

References Cited by the Examiner
UNITED STATES PATENTS

| | | | |
|---|---|---|---|
| 2,729,108 | 1/1956 | Vacquier et al. | 33—226 X |
| 2,887,782 | 5/1959 | Garwood | 33—222.7 |
| 2,959,865 | 11/1960 | Boose | 33—224 |
| 2,959,866 | 11/1960 | Seaman | 33—224 |
| 3,031,766 | 5/1962 | Schulte | 33—224 |

ROBERT B. HULL, *Primary Examiner.*